United States Patent [19]

De Courville

[11] Patent Number: 4,654,639

[45] Date of Patent: Mar. 31, 1987

[54] SIGNALING MATERIAL AND METHOD FOR PROTECTING SUBTERRANEAN STRUCTURES

[75] Inventor: Arnaud De Courville, Feyzin, France

[73] Assignee: Societe Anonyme Dite "Plymouth Francaise", Feyzin, France

[21] Appl. No.: 648,402

[22] Filed: Sep. 6, 1984

[30] Foreign Application Priority Data

Sep. 6, 1983 [FR] France ............................ 83 14438

[51] Int. Cl.⁴ .............................................. G08B 21/00
[52] U.S. Cl. ........................... 340/540; 116/DIG. 14; 405/157; 174/37
[58] Field of Search ................... 340/540, 500, 691; 116/DIG. 14; 174/37; 324/326; 405/157; 428/43, 44, 45, 47, 48, 53, 54, 61

[56] References Cited

U.S. PATENT DOCUMENTS 3,282,057 7/1961 Prosser ..................... 116/DIG. 14
3,568,626 3/1971 Southworth Jr. ........... 116/DIG. 14
4,070,911 1/1978 Makin ....................... 116/DIG. 14

FOREIGN PATENT DOCUMENTS 1194199 6/1970 United Kingdom ....... 116/DIG. 14

Primary Examiner—James L. Rowland
Assistant Examiner—Jeffery A. Hofsass
Attorney, Agent, or Firm—Karl F. Ross; Herbert Dubno

[57] ABSTRACT

A pipeline or other subterranean structure is protected by burying above it a signaling material in the form of a continuous support of a material having low resistance to rupture by carrying at least one row of spaced apart strip sections of a high resistance to rupture. Because the strip sections form a discontinuous band, when encountered by the excavator, the support ruptures and the strip sections can only be pulled and remain unsevered so that free ends of the sections are readily visible to the excavator operator.

1 Claim, 7 Drawing Figures

SIGNALING MATERIAL AND METHOD FOR PROTECTING SUBTERRANEAN STRUCTURES

FIELD OF THE INVENTION

My present invention relates to a signaling method and material for indicating the presence of a subterranean structure, e.g. a pipeline, electrical line or other buried object, to the operator of an excavator which might encounter the object and damage the same in the course of excavation if not for the signaling of the presence of such structure.

BACKGROUND OF THE INVENTION

One of the dangers of excavation is that the bucket, tooth or blade of an excavator will encounter a buried object such as a subterranean pipe, electric line, telephone line or other structure and damage it before the operator of the excavating machine realizes that he is in the presence of such a buried object.

Accordingly it is known to bury alongside such objects, generally above them, a signaling material which is intended to be seen by the operator of the excavating machine before the latter encounters the protected buried object.

The material in the past generally has comprised a continuous rectilinear strip whose resistance to elongation (tensile strength) and rupture resistance are different from those of a carrying grid, e.g. of synthetic resin material.

As the shovel or bucket of the excavator slices through this material, the material may be visible in the bucket or in the excavating trench in which the material has been exposed by the excavation.

In practice, however, the band or strip is not always visible either in the contents of the bucket or shovel or in the trench which is formed.

Indeed, there is a tendency for the bucket to cut rather cleanly through this prior art signaling material so that neither the portion of the band contained in the shovel nor the portion of the band remaining in the ground and from which the former portion has been severed may be visible to the operator.

This is especially the case where the ground in which the excavation is made is rather loose so that the walls of the trench cave in at least to some degree to obscure the residue of the material which remains buried to either side of the trench.

Consequently, the continuous longitudinal strips of the signal materials hitherto used may obscure the signal during excavation of the presence of pipes disposed below the material when mechanized excavation is carried out in the manner described.

OBJECTS OF THE INVENTION

It is, therefore, the principal object of the present invention to provide an improved signaling material whereby the aforementioned disadvantages are obviated and, in particular, the encountering of the material by a mechanized excavating shovel will invariably be signaled to the operator.

Another object of my invention is to provide an improved method of protecting subterranean structures against excavation damage which is more reliable than earlier methods.

It is also an object of this invention to provide an improved method of excavating which protects subjacent structures.

SUMMARY OF THE INVENTION

These objects and others which will become apparent hereinafter are attained, in accordance with the present invention with a signaling material which comprises a support having a comparatively low resistance to rupture (low tensile strength) and which is buried above a structure to be protected, e.g. a pipeline, and having secured thereto a multiplicity of longitudinally extending discontinuous strips such that at least one row of spaced apart strip sections are composed of a material having a substantially higher tensile strength and resistance to rupture than the support so that, when the bucket or mechanical shovel of the mechanical excavator cuts through the material, rather than severing a strip or strip section, at least one such section will separate from the support which readily ruptures and will be pulled out even if its end would normally be covered by adjacent unexcavated material to hang over the edge of the bucket of the mechanical excavator and invariably signal the presence of the material and hence of the subjacent structure to the operator.

Naturally, the length of the strip section should be greater than the maximum dimension of the excavating bucket which is likely to be used to ensure such an overhang and preferably two or more such rows are provided on a common support with the strip sections being staggered so that gaps between strip sections of one row are offset from the gaps between strip sections of another row.

The strip sections can be composed of any material having a significant tensile strength and preferably are composed of a metal which may be of a low corrodibility and can be provided with corrosion protection in the form of an appropriate coating, oriented or non-oriented synthetic resin (plastic) material, woven fiber bands or even non-woven plastic fiber bands.

The support can be composed of various materials as well, preferably polyvinyl chloride, polyethylene, or polypropylene either in the form of a foil or film, these or other synthetic fibers, cotton or the like.

The support may be a perforated or non-perforated film or foil, a grid or a woven or nonwoven sheet and, indeed, soil or ground stabilizing covering or openworks which have been utilized in the past for the stabilization of mobile terrain against erosion for example can equally be used. The support can also be biodegradable if desired.

According to one embodiment of the invention, the support is constituted by a grill, lattice or network of plastic elements upon which is fixed two bands which cover the respective rows of metal strips, the bands forming pockets in which the metal strips or strip sections are loosely held. The spacings between the strip sections of the two rows are offset in the manner described.

According to another embodiment of the invention, the support is constituted by a simple plastic band of low tensile strength and elongation to break, i.e. low resistance to rupture, while the strip sections are disposed on this band and are composed of a plastic material having a high resistance to rupture and can be tack welded to the band or otherwise loosely held thereon but nevertheless fixed thereto.

In another embodiment of the invention the signaling material is constituted by a plurality of rows of relatively widely spaced strip sections of plastic material transversely connected to comparatively weak elements to form a web.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 1:
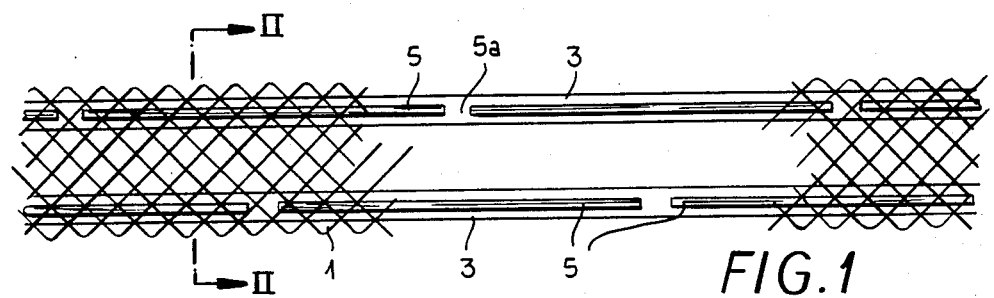
FIG. 1 is a diagrammatic plan view, partly broken away and from above, of a signaling material according to the invention.
Figures 2, 7:
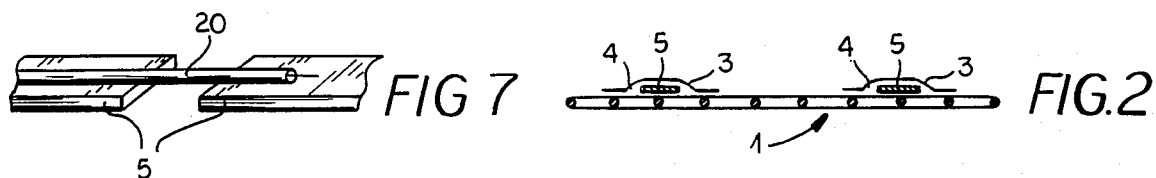
FIG. 2 is a transverse section taken along the line II—II of FIG. 1 and also in highly diagrammatic form.
FIG. 7 is a diagrammatic perspective view of a series of strips which are provided with an electrical conductor in accordance with a feature of the invention.

As can be seen from FIG. 1, the signaling material of the invention for signaling the presence of a pipe or other underground structure P (see FIG. 5) comprises a grill 1 composed of plastic material and thermally bonded to two plastic foil or sheet bands 3 fused along their longitudinal edges to the grill and thereby forming respective pockets 4 (FIG. 2).

Each of these pockets receives a multiplicity of metal strip sections 5 disposed in spaced apart relationship and thereby constituting elements of substantially greater resistance to rupture than the plastic support 1, 3. The strip sections 5 may also be composed of a plastic material having this greater resistance to rupture and the section lengths are such that they exceed the largest dimension of the bucket or shovel which is likely to be used for mechanized excavation in the region. The sections 5 are spaced apart by gaps 5a and the gaps 5a of the two rows are longitudinally offset from one another so that, in the embodiment of FIGS. 1 and 2, each gap is located midway of the strip section of the other row.

Figure 3:
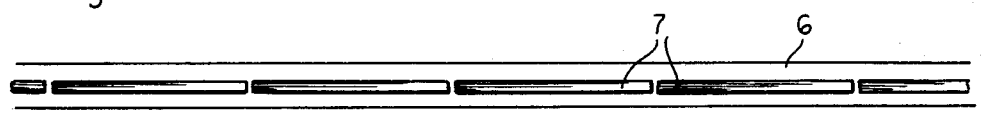
FIG. 3 is a diagram representing a top plan view of a second embodiment of the signaling material according to the invention.

In the embodiment of FIG. 3, the support is constituted by a simple band 6 of a plastic material having low resistance to rupture and upon which is fixed, e.g. by tack welds, individual strips 7, spaced apart by gaps, and having a high resistance to rupture.

Figure 4:
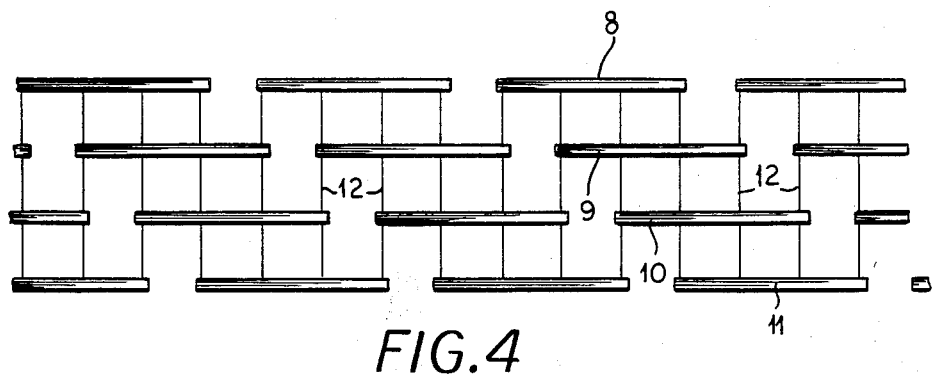
FIG. 4 is a top plan view of a third embodiment also in highly diagrammatic form.

In the embodiment of FIG. 4 a ladder structure forms the signaling material and is constituted by four rows of strip 8 of high resistance to rupture, separated by substantially larger gaps than in the cases described earlier. These strips are shown at 8, 9, 10 and 11 and are parallel to one another and transversely spaced with the gaps of the rows being staggered across the ladder or web.

The strip sections are held together by transversely plastic elements or stands 12 of low rupture resistance, thermally bonded to all of the strips across the band in the region of each transverse element 12.

In all of the embodiments described, the high strength strips are discontinuous, i.e. in the form of sections 5, 7–11 with gaps between the sections and, where more than one row is provided, longitudinal staggering of the gaps of the row.

Figure 5:
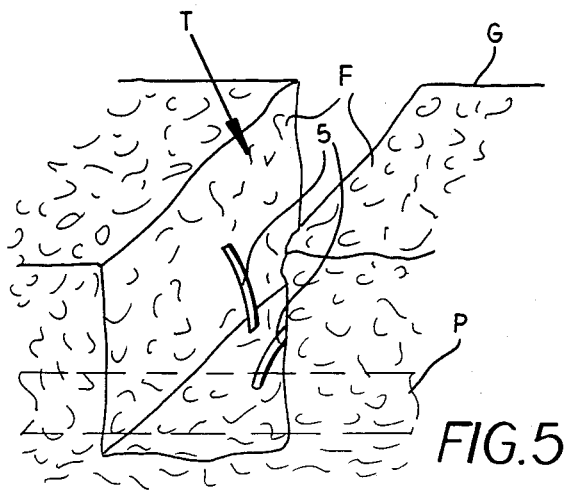
FIG. 5 is a diagrammatic perspective view of a trench illustrating the use of the material of the invention.
Figure 6:
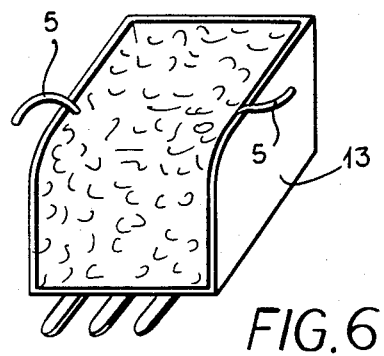
FIG. 6 is a perspective view of a shovel of a mechanical excavator which demonstrates the use of the invention.

The material is laid in the ground G (FIG. 5) above the structure P to be protected and upon excavation by a shovel 13, for example, the support readily tears generally along the flanks F of the trench T. However, because the strip sections are of substantially greater strength and are relatively loosely held, rather than being severed, they are pulled out, either from the material in the shovel or from the adjacent buried portion of the signaling material so that ends of the strip sections as shown in FIGS. 5 and 6 overhang the trench walls or the sides of the shovel. When the trench is cut in compact soil, therefore, the ends of the bands are not only visible in the bucket 13 but also in the trench, but even in loose soil, where the ends remaining in the ground may be covered by cave in. The ends nevertheless project from the bucket.

It has been found to be advantageous as represented in FIG. 7 to tack weld a metal conductor 20 which may be insulated or not to the strip sections 5 so that a closed electric circuit can be formed which is readily broken by the excavator. This can be used to signal the attack on the subterranean structure utilizing conventional alarm circuitry. The conductor can also be applied to the support which generally consists of an insulating material, directly.

I claim:
1. A device adapted to be buried in the ground above a structure to be protected, the device comprising:
   a continuous elongated support formed by a multiplicity of transverse plastic elements of low resistance to rupture, and
   a plurality of parallel and longitudinally extending rows of longitudinally spaced strip sections mounted on and unitarily interconnected by the transverse elements and of high resistance to rupture so that upon encountering the device a mechanical excavator will pull the sections while rupturing the support and thereby signal the presence of the device and the structure in the ground by visible ends of the sections, the spaces between the strip sections of one row being offset longitudinally from the spaces of the strip sections of the other rows.

* * * * *